(12) United States Patent
Sandhu (10) Patent No.: US 7,515,541 B2
(45) Date of Patent: Apr. 7, 2009

(54) TRANSMISSION OF DATA WITH FEEDBACK TO THE TRANSMITTER IN A WIRELESS LOCAL AREA NETWORK OR THE LIKE

(75) Inventor: Sumeet Sandhu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 913 days.

(21) Appl. No.: 10/738,522

(22) Filed: Dec. 16, 2003

(65) Prior Publication Data

US 2005/0030897 A1 Feb. 10, 2005

Related U.S. Application Data

(60) Provisional application No. 60/493,937, filed on Aug. 8, 2003.

(51) Int. Cl.
*H04J 3/14* (2006.01)
(52) U.S. Cl. ........................ 370/236; 370/349
(58) Field of Classification Search ............... 370/236, 370/349
See application file for complete search history.

(56) References Cited

U.S. PATENT DOCUMENTS

| | | | | |
|---|---|---|---|---|
| 5,274,667 | A * | 12/1993 | Olmstead | 375/145 |
| 5,644,568 | A * | 7/1997 | Ayerst et al. | 370/311 |
| 5,722,051 | A * | 2/1998 | Agrawal et al. | 455/69 |
| 6,452,941 | B1 * | 9/2002 | Bruhn | 370/468 |
| 6,735,448 | B1 * | 5/2004 | Krishnamurthy et al. | 455/522 |
| 2002/0122383 | A1 * | 9/2002 | Wu et al. | 370/210 |
| 2002/0163933 | A1 * | 11/2002 | Benveniste | 370/465 |
| 2002/0191573 | A1 | 12/2002 | Whitehill et al. | |
| 2003/0103521 | A1 * | 6/2003 | Raphaeli et al. | 370/445 |
| 2003/0133427 | A1 * | 7/2003 | Cimini et al. | 370/338 |
| 2003/0174671 | A1 * | 9/2003 | Chen | 370/329 |
| 2003/0181165 | A1 * | 9/2003 | Sugar et al. | 455/69 |
| 2003/0204615 | A1 | 10/2003 | Wei et al. | |
| 2004/0008627 | A1 * | 1/2004 | Garg et al. | 370/235 |
| 2004/0151145 | A1 * | 8/2004 | Hammerschmidt | 370/338 |
| 2004/0190507 | A1 * | 9/2004 | Wu et al. | 370/389 |
| 2005/0136933 | A1 | 6/2005 | Sandhu et al. | |

(Continued)

FOREIGN PATENT DOCUMENTS

EP 0 872 979 A2 10/1998

(Continued)

OTHER PUBLICATIONS

Rappaport, Theodore, et al, "Wireless Communications: Past Events and a Future Perspective", IEEE Communications Magazine, May 2002, pp. 148 through 161, vol. 40, No. Special Issue, IEEE Service Center, New York, NY, US.

(Continued)

*Primary Examiner*—Kwang B. Yao
*Assistant Examiner*—Andrew Lai
(74) *Attorney, Agent, or Firm*—Schwabe, Williamson & Wyatt, P.C.

(57) ABSTRACT

Briefly, in accordance with one embodiment of the invention, a transmitter may adaptively select between a post-data channel feedback system and a pre-data channel feedback system based at least in part on packet length and channel conditions.

22 Claims, 3 Drawing Sheets

U.S. PATENT DOCUMENTS

2005/0147076 A1 7/2005 Sadowsky et al.
2005/0152484 A1 7/2005 Sandhu et al.

FOREIGN PATENT DOCUMENTS

| EP | 1 178 623 | A2 | 2/2002 |
| EP | 1 394 977 | A1 | 3/2004 |
| WO | WO 2005/018135 | A2 | 2/2005 |

OTHER PUBLICATIONS

Bingham, John A. C., "Multicarrier Modulation for Data Transmission: An Idea Whose Time Has Come", IEEE Communications Magazine, May, 1990, pp. 5 through 8, 11, vol. 28, No. 5, IEEE Service Center, New York, NY, US.

* cited by examiner

TRANSMISSION OF DATA WITH FEEDBACK TO THE TRANSMITTER IN A WIRELESS LOCAL AREA NETWORK OR THE LIKE

CROSS-REFERENCE TO RELATED APPLICATION

The present application claims the benefit of U.S. provisional application Ser. No. 60/493,937, filed Aug. 8, 2003, entitled "A HIGH-THROUGHPUT WIRELESS NETWORK ARCHITECTURE, APPARATUS AND ASSOCIATED METHODS".

BACKGROUND OF THE INVENTION

In a wireless local area network (WLAN) communication system or the like, a media access control (MAC) layer based on carrier sense multiple access (CSMA) transmits data in packets which may contend for the medium with other packets each time the packets are transmitted. Current WLAN systems such as those compliant with an IEEE 802.11 specification do not utilize channel feedback. Instead, the transmitter estimates the channel state by the number of channel acknowledgements (ACKs) that it receives. Such a system may result in an undesirable feedback loop where the modulation rate may be adapted downwards rather quickly, but may only increase slowly.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (QSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Figure 1:
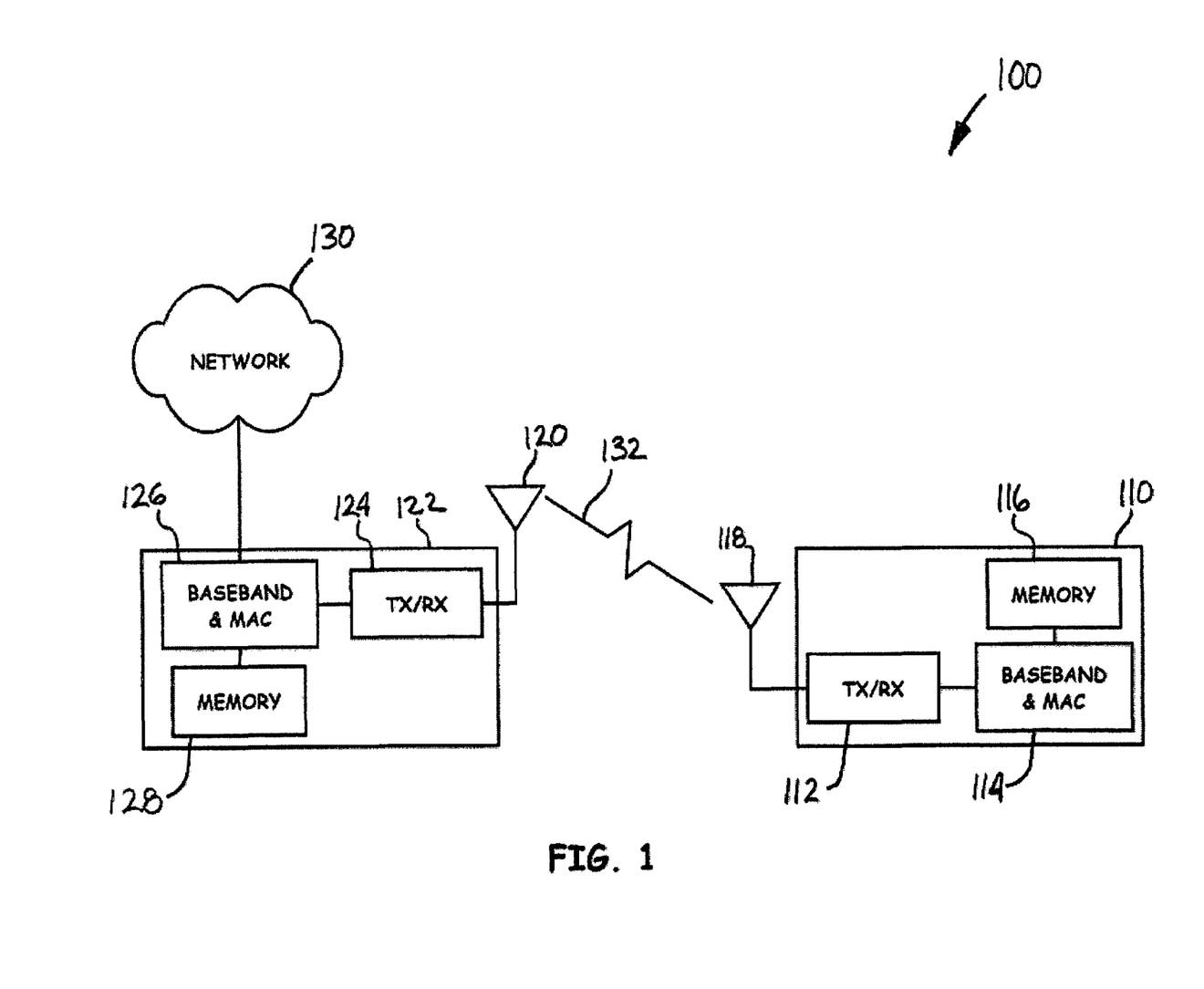
FIG. 1 is a block diagram of a wireless local area network system in accordance with one embodiment of the present invention.

Referring now to FIG. 1, a wireless local area network communication system in accordance with one embodiment of the present invention will be discussed. In the wireless local area network (WLAN) communication system 100 shown in FIG. 1, a mobile unit 110 may include a wireless transceiver 112 to couple to an antenna 118 and to a processor 114 to provide baseband and media access control (MAC) processing functions. Processor 114 in one embodiment may comprise a single processor, or alternatively may comprise a baseband processor and an applications processor, although the scope of the invention is not limited in this respect. Processor 114 may couple to a memory 116 which may include volatile memory such as DRAM, non-volatile memory such as flash memory, or alternatively may include other types of storage such as a hard disk drive, although the scope of the invention is not limited in this respect. Some portion or all of memory 116 may be included on the same integrated circuit as processor 114, or alternatively some portion or all of memory 116 may be disposed on an integrated circuit or other medium, for example a hard disk drive, that is external to the integrated circuit of processor 114, although the scope of the invention is not limited in this respect.

Mobile unit 110 may communicate with access point 122 via wireless communication link 132, where access point 122 may include at least one antenna 120. In an alternative embodiment, access point 122 and optionally mobile unit 110 may include two or more antennas, for example to provide a spatial division multiple access (SDMA) system or a multiple input, multiple output (MIMO) system, although the scope of the invention is not limited in this respect. Access point 122 may couple with network 130 so that mobile unit 110 may communicate with network 130, including devices coupled to network 130, by communicating with access point 122 via wireless communication link 132. Network 130 may include a public network such as a telephone network or the Internet, or alternatively network 130 may include a private network such as an intranet, or a combination of a public and a private network, although the scope of the invention is not limited in this respect. Communication between mobile unit 110 and access point 122 may be implemented via a wireless local area network (WLAN), for example a network compliant with a an Institute of Electrical and Electronics Engineers (EEE) standard such as IEEE 802.11a, IEEE 802.11b, IEEE 802.11 in, HiperLAN-II, and so on, although the scope of the invention is not limited in this respect. In another embodiment, communication between mobile unit 110 and access point 122 may be at least partially implemented via a cellular communication network compliant with a Third Generation Partnership Project (3GPP) standard, although the scope of the invention is not limited in this respect.

Figure 2:
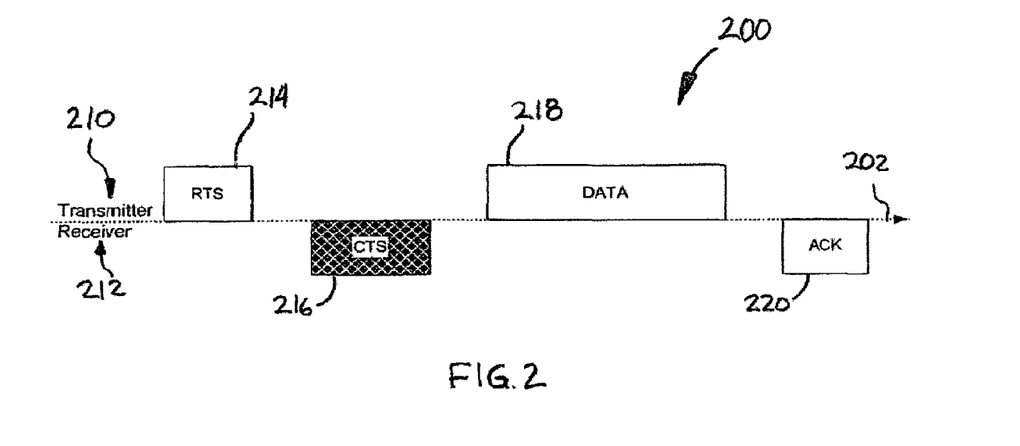
FIG. 2 is a timing diagram of a wireless local area network system utilizing pre-data channel feedback in accordance with one embodiment of the present invention.

Referring now to FIG. 2, a timing diagram of a wireless local area network system utilizing pre-data channel feedback in accordance with one embodiment of the invention will be discussed. In the timing diagram 200 shown in FIG. 2, the horizontal axis 202 represents time wherein blocks appearing above horizontal axis 202 represent packets transmitted by a transmitter 210 and blocks appearing below horizontal axis 202 represent packets transmitted by a receiver 212. In one embodiment of the invention, transmitter 210 may correspond to access point 122 and receiver 212 correspond to mobile unit 110 in WLAN system 100 of FIG. 1, although the scope of the invention is not limited in this respect.

As shown in FIG. 1, transmitter 210 may transmit a request to send (RTS) packet 214 to receiver 212. In response to receiving RTS packet 214, receiver 212 may transmit a clear to send (CTS) packet 216 back to transmitter 210 to indicate that it is not receiving data from another node on the network so that transmitter 210 may then transmit a data packet 218 to receiver. After receiving the data packet 218, receiver 212 may then transmit an acknowledgement (ACK) packet 220 to transmitter 210 that receiver 212 has received data packet 218. In accordance with one embodiment of the invention, CTS packet 216 may include channel information that is sent back to transmitter 210 by receiver 212 prior to transmitter 210 transmitting data packet 218 to receiver 212. In such an embodiment, such a pre-data channel feedback arrangement may provide a higher signal quality and may further provide a higher spectral efficiency due to training of the transmitter of the channel. Furthermore, such a pre-data channel feedback arrangement may provide a lower probability of collision of data packets with other transmitted packets since data packet 218 may not be transmitted until after CTS packet 216 is received by transmitter 210, although the scope of the invention is not limited in this respect.

Figure 3:
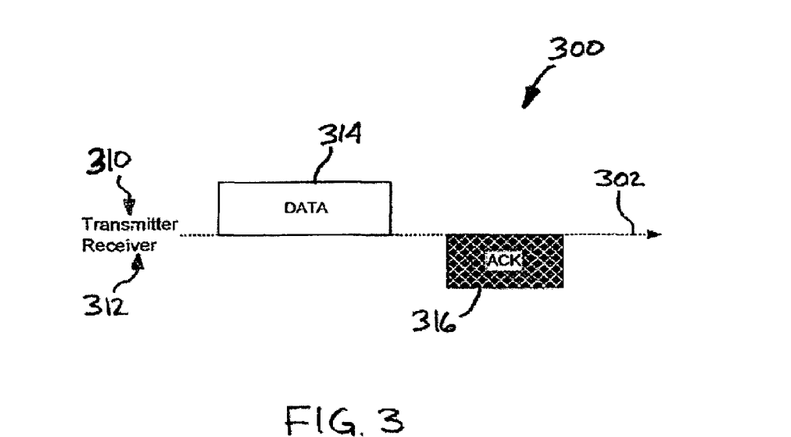
FIG. 3 is a timing diagram of a wireless local area network system utilizing post-data channel feedback in accordance with one embodiment of the present invention.

Referring now to FIG. 3, a timing diagram of a wireless local area network system utilizing post-data channel feedback in accordance with one embodiment of the invention will be discussed. In the timing diagram 300 shown in FIG. 3, the horizontal axis 302 represents time wherein blocks appearing above horizontal axis 302 represent packets transmitted by a transmitter 310 and blocks appearing below horizontal axis 302 represent packets transmitted by a receiver 312. In one embodiment of the invention, transmitter 310 may correspond to access point 122 and receiver 312 may correspond to mobile unit 110 in WLAN system 100 of FIG. 1, although the scope of the invention is not limited in this respect.

As shown in timing diagram 300 of FIG. 3 in one embodiment, transmitter 310 may transmit a data packet 314 directly to receiver 312 prior to receiving any clear to send packet or prior to knowledge of the channel. After receiver 312 receives data packet 314, receiver 312 may transmit an acknowledgement (ACK) packet back to transmitter 310 to indicate to transmitter 310 that receiver 312 has received data packet 314. In one embodiment of the invention, ACK packet 316 may include channel information transmitted from receiver 312 to transmitter 310. After receiving the channel information in ACK packet 316, transmitter 310 may make appropriate changes based on the channel information for subsequent transmissions. Such a post-data channel feedback system may provide lower overhead since fewer packets are transmitted and received, and may be suitable for shorter length packets. In addition, such a post-data channel feedback system may be suitable for stationary environments where the channel does not change rapidly over time, although the scope of the invention is not limited in this respect.

Figure 4:
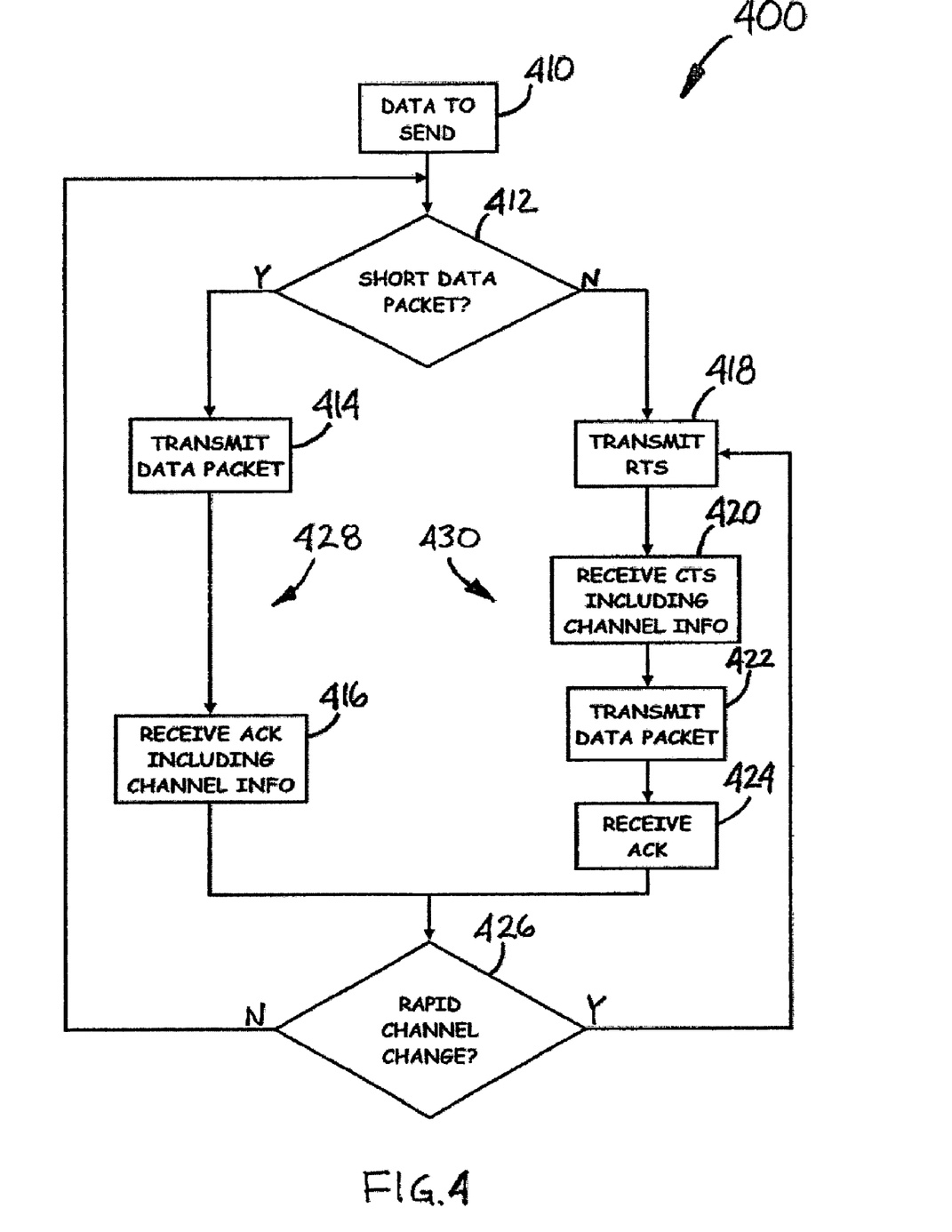
FIG. 4 is a flow diagram of a method to transmit data with feedback to the transmitter in a wireless local area network system in accordance with an embodiment of the present invention.

Referring now to FIG. 4, a flow diagram of a method to transmit data with feedback to the transmitter in a wireless local area network system in accordance with an embodiment of the present invention will be discussed. In the method 400 as shown in FIG. 4, a wireless local area network system such as WLAN system 100 of FIG. 1 may adaptively select between operation in a pre-data channel feedback mode, such as illustrated by timing diagram 200 of FIG. 2, and a post-data channel feedback mode, such as illustrated by timing diagram 300 of FIG. 3, although the scope of the invention is not limited in this respect. In method 400, a transmitter such as transmitter 210 or 310 may have data to send at block 410. A determination may be made at block 412 whether the data packet to send is a shorter data packet. If the data packet is a shorter data packet, then the transmitter may operate in a post-data channel feedback mode by following branch 428 wherein the data packet may be transmitted at block 416. An acknowledgement packet may be received at block 416 that may include channel information, although the scope of the invention is not limited in this respect.

In the event the packet is determined at block 412 to be a longer data packet, then the transmitter may operate in a pre-data channel feedback mode by following branch 430 wherein a ready to send packet may be transmitted at block 418. The transmitter may then receive a clear to send packet at block 410 that may include channel information. The transmitter may then transmit the data packet at block 422, and the transmitter may receive an acknowledgement packet at block 424 after the receiver receives the data packet, although the scope of the invention is not limited in this respect.

After operating in either a post-data channel feedback mode or in a pre-data channel feedback mode, the transmitter may have knowledge of the channel, either from the acknowledgment packet received at block 416 or from the clear to send packet received at block 420. A determination may be made at block 426 whether the channel is rapidly changing over time, for example if mobile unit 110 is moving over time while operating where mobile unit corresponds to receiver 212 or receiver 312. In the event the channel is rapidly changing, transmitter may continue to transmit in a pre-data channel feedback mode by operating along branch 430. In the event the channel is not rapidly changing, then method 400 may branch to block 412 to determine whether a subsequent packet is a short data packet, and if so, then transmitter may switch to a post-data channel feedback mode by operating along branch 428, although the scope of the invention is not limited in this respect. In the arrangement shown in FIG. 4, transmitter may adaptively select between operating in a post-data channel feedback mode and a pre-data channel feedback mode according to the packet data length and changes in the channel condition, although the scope of the invention is not limited in this respect.

In accordance with one particular embodiment of the invention, the decision to operate in either a post-data channel feedback mode or in a pre-data channel feedback mode may be based at least in part on the amount of interference that may exist in the environment between the transmitter and the receiver. In such an embodiment, at block 412 for example, a determination may be made by the transmitter whether there are a higher number of collisions in the network, for example as measured by the number of retransmissions required to transmit a packet where a higher number of retransmissions may indicate a higher number of collisions caused by a higher amount of interference in the network environment. In the event of a higher amount of interference thus described, a determination may be made at block 412 to operate in a pre-data channel feedback mode along branch 430 even where the packet to be transmitted is a shorter packet that would otherwise allow for operation in a post-data channel feedback mode along branch 428 in the absence of such a higher amount of interference, although the scope of the invention is not limited in this respect. In such an embodiment, the RTS/CTS pre-data channel mode may also be used for obtaining channel information and may provide for at least two functions. First, the transmitter may reserve the channel such that potential interferers are not transmitting if not part of the RTS/CTS, and the transmitter may have channel knowledge prior to transmission of data so that the transmitter may perform adaptive bit-loading which may reduce interference by adapting in frequency, or the transmitter may also perform beam forming which may reduce interference spatially, although the scope of the invention is not limited in this respect.

In accordance with one embodiment of the invention, different types of channel knowledge may be broadly categorized. In the examples described herein may be applicable to multiple-input, multiple output (MIMO) systems or orthogonal frequency division multiple access (OFDM) systems with Mt number of transmit antennas, Mr receive antennas, and N number of Fast-Fourier Transform (FFT) tones. The type of channel feedback in accordance with the present invention is not limited to that described in the table, below. Other types of channel feedback may be included, and the information in the table, below may be simplified in alternative embodiments to reduce feedback and overhead.

TABLE 1

Types of channel information fed back to the transmitter in a MIMO system

| Category | Quantities fed back | Amount of information |
|---|---|---|
| Full channel knowledge | Mr × Mt channel matrix per tone | Mr × Mt × N × Qc<br>Qc = bits describing each channel element |
| Partial channel knowledge | Left singular matrix of channel per tone | Mr × Mt × N × Qr<br>Qr = bits describing each matrix element |
|  | Channel rank per tone | N × Qr<br>Qr = bits describing rank |
|  | SNR per tone, or average SNR over all tones | N × Qs<br>Qs = bits describing SNR |
| Modulation type | Modulation per tone, or one modulation for all tones | N × Qm<br>Qm = bits describing total # MIMO modulations |

In Table 1, Mr means the number of receive antennas, Mt means the number of transmit antennas, N means the number of FFT tones, and Qa means the bits describing the quantity "a". The quantity of post-data channel feedback may be further reduced in the event channel information, such as one of the quantities in Table 1, is already available at the transmitter. Such a condition may occur in one or more ways, for example where the transmitter may utilize an older channel estimate where the channel has been sufficiently stationary, where the transmitter may estimate the channel by snooping on other packets transmitted in the environment meant for other destinations or nodes, or where the transmitter may estimate the channel by using reciprocity of the channel for example in a time division duplex (TDD) system, although the scope of the invention is not limited in this respect. By introducing channel feedback into the system such as WLAN system 100, both the signal quality and the modulation rate may be adapted optimally to match the channel conditions. By including channel feedback in an acknowledgment packet when possible in a post-data channel feedback mode for example, may reduce the total overhead incurred by the RTS and CTS packets, such as where the channel may be relatively stationary, although the scope of the invention is not limited in this respect. In one particular embodiment of the invention, actual channel parameters may be fed back less frequently, and modulation type may be fed back more frequently where the modulation type may include, for example, QAM constellation size, code rate, code type, and so on, although the scope of the invention is not limited in this respect.

It should be noted that the transmission of data with feedback to the transmitter in accordance with the present invention may be applied to the physical layer of any wireless system, for example single antenna, single output (SISO) systems having single antennas, multiple input, multiple output (MIMO) systems having one or many antennas, to single channel systems, to channel-bonded systems, to single carrier systems, to orthogonal frequency division multiplexing (OFDM) systems, to code division, multiple access systems, to carrier sense multiple access (CSMA) systems, wide area network systems, local area network systems, personal area network systems, wired systems such as Ethernet systems, and so on, without departing from the scope of the present invention and without providing substantial change thereto.

Although the invention has been described with a certain degree of particularity, it should be recognized that elements thereof may be altered by persons skilled in the art without departing from the spirit and scope of the invention. It is believed that the transmission of data with feedback to the transmitter in a wireless local area network system or the like of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A method, comprising:
   determining by a transmitter device of a wireless network whether a data packet to be transmitted is a shorter or longer data packet, a shorter data packet being a smaller data packet than a longer data packet;
   operating by the transmitter device in a post-data channel feedback mode including receiving channel information after transmitting the data packet, if the data packet is determined to be a shorter data packet, otherwise, operating by the transmitter device in a pre-data channel feedback mode including receiving channel information before transmission of the data packet, if the data packet is determined to be a longer data packet;
   wherein the channel information is to be used by the transmitter device to improve signal quality of packet or packets to be transmitted following reception of the channel information; and
   receiving reduced amount of channel information when channel information is already known by the transmitter device.

2. A method as claimed in claim 1, wherein if the data packet is determined to be a shorter data packet, said receiving channel information after transmitting the data packet comprises receiving the channel information in an acknowledgement packet.

3. A method as claimed in claim 1, wherein said determining further includes determining by the transmitter device whether a channel is rapidly changing, and if the channel is rapidly changing, then operating by the transmitter device in the pre-data channel feedback mode, regardless of whether the data packet is determined to be a shorter or a longer packet.

4. A method as claimed in claim 1, wherein if the data packet is determined to be a longer data packet, said receiving channel information before transmission of the data packet comprises receiving the channel information in a clear to send packet.

5. A method as claimed in claim 1, further comprising:
   determining by the transmitter device whether a channel has changed based at least in part in the channel information;
   if the channel has not changed, determining by the transmitter device whether a subsequent data packet is a shorter data packet; and
   if the subsequent packet is determined to be a shorter data packet, operating by the transmitter device in a post-data channel feedback mode.

6. A method, comprising:
   determining by a receiver device of a wireless network whether a data packet to be transmitted from a transmitter device of the wireless network to the receiver device is a shorter data packet or a longer data packet;
   operating by the receiver in a post-data channel feedback mode wherein the receiver device includes with an acknowledgement packet channel information, if the data packet is determined to be a shorter data packet, otherwise operating by the receiver device in a pre-data channel feedback mode wherein the receiver device includes a clear to send packet with channel information, if the data packet is determined to be a longer data packet;
   wherein the channel information is to be used by the transmitter device to improve signal quality of packet or packets to be transmitted by the transmitter device;
   determining by the receiver device whether channel information is already known by the transmitter device; and
   if so, reducing by the receiver device an amount of channel information to be transmitted to the transmitter device.

7. An article of manufacture, comprising:
   a storage medium having stored thereon instructions that, when executed by a computing platform, causes the computing platform to;
   determine whether a data packet to be transmitted is a shorter or longer data packet, a shorter data packet being a smaller data packet than a longer data packet;
   operate in a post-channel data feedback mode including receiving channel information after transmitting the data packet, if the data packet is determined to be a shorter data packet, otherwise, operate in a pre-data channel feedback mode including receiving channel information before transmission of the data packet, if the data packet is determined to be a longer data packet;

wherein the channel information is to be used to improve signal quality of packet or packets to be transmitted following reception of the channel information; and wherein said instructions to cause the computing platform to receive reduced amount of channel information when channel information is already known.

8. An article of manufacture as claimed in claim 7, wherein if the data packet is determined to be a shorter data packet then receive channel information after transmitting the data packet in an acknowledgement packet.

9. An article of manufacture as claimed in claim 7, wherein said determine includes determining whether a channel is rapidly changing, and if the channel is rapidly changing, then operate in the pre-data channel feedback mode regardless of whether the data packet is determined to be a shorter or a longer packet.

10. An article of manufacture as claimed in claim 7, wherein if the data packet is determined to be a longer data packet then receive channel information before transmission of the data packet in a clear to send packet.

11. An article of manufacture, comprising:
a storage medium having stored thereon instructions that, when executed by a computing platform, causes the computing platform to:
determine whether a data packet to be received from a transmitter device of a wireless network is a shorter data packet or a longer data packet; and
operate in a post-data channel feedback mode to include with an acknowledge packet channel information, if the data packet is determined to be a shorter data packet, otherwise operate in a pre-data channel feedback mode to include with a clear to send packet channel information, if the data packet is determined to be a longer data packet;
wherein the channel information is to be used by the transmitter device to improve signal quality of packet or packets to be transmitted by the transmitter device; and
wherein the instructions, when executed, further causes the computing platform to:
determine whether channel information is already known to the transmitter device; and
if so, reduce an amount of channel information to be transmitted to the transmitter device.

12. An article of manufacture as claimed in claim 11, wherein the instructions, when executed, further causes the computing platform to determine what channel information has changed since a previous channel feedback event, and transmit information related to the information that has changed.

13. An apparatus, comprising:
an omnidirectional antenna;
a transceiver to couple to said omnidirectional antenna;
a basehand processor to determine whether a data packet to be transmitted through the transceiver is a shorter or a longer data packet, a shorter data packet being a smaller data packet than a longer data packet, to cause the transceiver to operate in a post-channel data feedback mode including receiving channel information after transmitting the data packet, if the data packet is determined to be shorter data packet, otherwise, causing the transceiver to operate in a pre-data channel feedback mode including receiving channel information before transmission of the data packet, if the data packet is determined to be a longer data packet, and wherein the channel information is to be used to improve signal quality of packet or packets to be transmitted following reception of the channel information; and wherein said baseband processor to cause said transceiver to receive reduced amount of channel information when channel information is already known.

14. An apparatus as claimed in claim 13, wherein if said baseband processor determines that the data packet to be transmitted is a shorter data packet then said baseband processor causes said transceiver to receive the channel information in an acknowledgement packet.

15. An apparatus as claimed in claim 13, said baseband processor is adapted to determine whether a channel is rapidly changing, and if the channel is not rapidly changing, causes said transceiver to operate in the post-data channel feedback mode regardless of whether the data packet is determined to be a shorter or a longer data packet.

16. An apparatus as claimed in claim 13, wherein said baseband processor is adapted to determine whether the wireless network has a lower or a higher level of interference, a lower level of interference being a lower interference level than a higher level of interference, and if the wireless network is determined to have a higher level of interference, the baseband processor causes said transceiver to operate in the pre-data channel feedback mode regardless of whether the data packet is a shorter or a longer data packet.

17. An apparatus as claimed in claim 16, wherein said baseband processor causes said receiver to operate in the post-data channel feedback mode if the wireless network is determined to have a lower level of interference.

18. An apparatus as claimed in claim 13, wherein if said baseband processor determines that the data packet to be transmitted is a longer data packet then said baseband processor causes said transceiver to receive the channel information in a clear to send packet.

19. A method, comprising:
determining whether to operate in a post-data channel feedback mode;
if so determined, operating in a post-channel data feedback mode, wherein channel information is provided from a receiver to a transmitter after transmission of a data packet without requiring transmission of a request to send packet or a clear to send packet;
otherwise operating in a pre-data channel feedback mode wherein channel information is provided from the receiver to the transmitter before transmission of a data packet; and
determining whether channel information is already known at the transmitter, and if so, reducing an amount of channel information to be fed back from the receiver to the transmitter.

20. A method as claimed in claim 19, wherein the channel information includes one of a higher amount of channel knowledge, a partial amount of channel knowledge, and a modulation type.

21. A method as claimed in claim 20, wherein the modulation type includes at least one of modulation per tone or one modulation for all tones.

22. A method as claimed in claim 19, wherein said determining includes determining what information has changed since a previous channel feedback event, and transmitting information related to what information has changed to the receiver.

* * * * *

UNITED STATES PATENT AND TRADEMARK OFFICE
CERTIFICATE OF CORRECTION

| | |
|---|---|
| PATENT NO. | : 7,515,541 B2 |
| APPLICATION NO. | : 10/738522 |
| DATED | : April 7, 2009 |
| INVENTOR(S) | : Sumeet Sandhu |

It is certified that error appears in the above-identified patent and that said Letters Patent is hereby corrected as shown below:

Column 7
Lines 59-60, "...a shorter or longer data packet,..." should read --...a shorter or a longer data packet,...--.

Column 8
Line 42, "...by the receiver in a..." should read --...by the receiver device in a...--.
Line 61, "...platform to;..." should read --...platform to:...--.
Line 63, "...or longer data packet,..." should read --...or a longer data packet,...--.
Line 64, "...a longer packet;..." should read --...a longer data packet;...--.

Column 9
Line 33, "...an acknowledge packet..." should read --...an acknowledgement packet...--.
Line 57, "...a basehand processor..." should read --...a baseband processor...--.

Column 10
Lines 14-15, "...claim 13, said baseband processor..." should read --...claim 13, wherein said baseband processor...--.

Signed and Sealed this

Twenty-eighth Day of September, 2010

David J. Kappos
*Director of the United States Patent and Trademark Office*